Sept. 11, 1928.

O. HENSELMAN

ANTIFRICTION BEARING 1,684,352

Original Filed Aug. 18, 1925    2 Sheets-Sheet 1

Otto Henselman, INVENTOR.

BY

Geo. F. Kimmel, ATTORNEY.

Sept. 11, 1928.
O. HENSELMAN
1,684,352
ANTIFRICTION BEARING
Original Filed Aug. 18, 1925  2 Sheets-Sheet 2
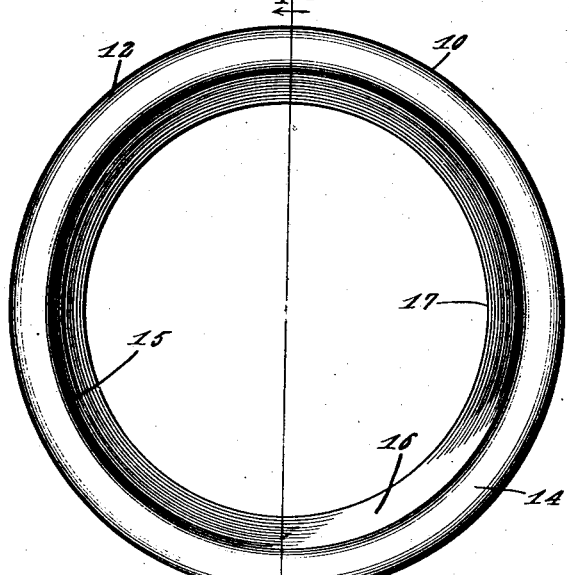
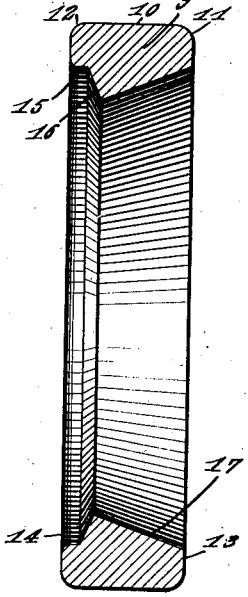
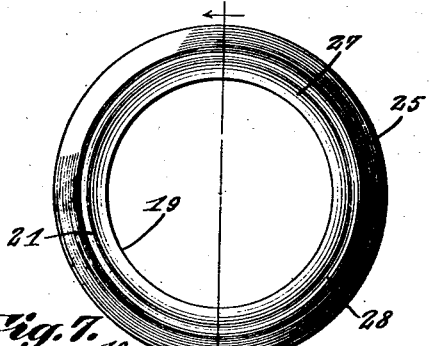
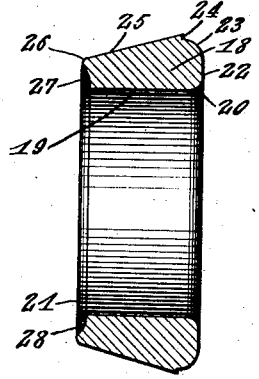
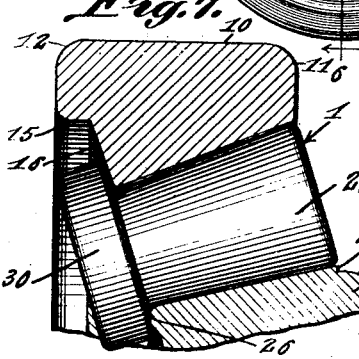
Otto Henselman, INVENTOR.
BY
Geo. P. Kimmel. ATTORNEY.

Patented Sept. 11, 1928.

1,684,352

UNITED STATES PATENT OFFICE.

OTTO HENSELMAN, OF CANTON, OHIO.

ANTIFRICTION BEARING.

Application filed August 18, 1925, Serial No. 51,021. Renewed July 1, 1927.

This invention relates to improvements in anti-friction bearings, more particularly the type in which cone-shaped rollers, as contradistinguished from balls, are used, and the invention has for its object to provide, in a manner as hereinafter set forth, a bearing of the class referred to, whereby its construction and arrangement will be such as to provide for a full flow of lubricant to prevent burning of the bearing when in active position, and further to simplify the construction of bearings of this type as well as reduce their cost and at the same time provide a correlation of the elements which will insure more efficient operation and greater durability of the bearing as an entirety.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 3 is a front elevation of the cup or race member.

Figure 4 is a section on line 4—4, Figure 3.

Figure 5 is a front elevation of the cone.

Figure 6 is a section on line 6—6, Figure 5.

Figure 7 is a fragmentary view, in section, upon an enlarged scale, illustrating the position of the roller relative to the cup and cone.

Figure 1:
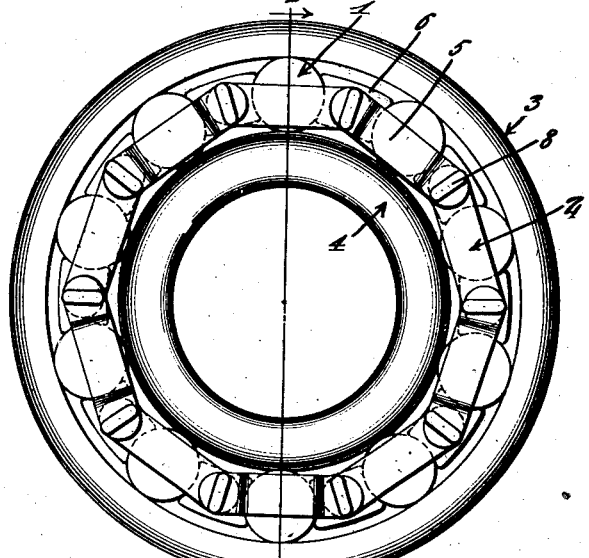
Figure 1 is a front elevation of an anti-friction bearing in accordance with this invention.

Referring to the drawings in detail, each of the rollers is generally referred to by the reference character 1, the cage generally by the reference character 2, the cup or race member generally by the reference character 3, and the cone generally by the reference character 4.

The cage 2 is annular in form and consists of two sets of pivoted links. Each set is of circular contour and indicated at 5. Arranged between and pivotally connected with the sets of links are spacing members 6, which are arranged in spaced relation, provided with curved sides and between each pair of spacing members 6 is arranged a roller 1. As will be hereinafter set forth, each of the rollers 1 includes a circular head at one end which is of greater diameter than the body of the roller, and the spacing members 6 at one end are cut-away to provide clearances for the disks of the rollers. The pivots between the sets of links can be of any suitable construction, cotter pins if desired, and are indicated at 8, and the pivots extend through the spacing members 6.

The cup or face member 3 is in the form of an annulus 9 and in cross section the outer side face 10 thereof extends in a straight plane. Each outer corner of the annulus 9 is rounded, as at 11, 12. The front face 13 of the annulus 9 is of less width than the rear face 14 thereof, and the latter is incut to form an annular shoulder 15, which in cross section extends in a plane parallel to the plane of the outer side face 10. The shoulder 15 terminates in an annular ledge 16 which in cross section extends towards the axis of the annulus 9 and inclines forwardly towards the front face 15. The ledge 16 terminates in the inner side face 17 of the annulus 9, and in cross section said inner side face inclines downwardly from its point of joinder with the ledge 16 to its point of joinder with the front face 13, and under such conditions the inner side face of the annulus 9 is bevelled in an inward direction from the rear to the front of the annulus. The shoulder 15 in connection with the ledge 16 provides a lubricant container at the rear of the race member.

The cone 4 is in the form of an annulus 18 and the inner side face 19 thereof, in cross section, extends in a straight plane. The forward inner corner of the annulus 18 is rounded, as at 20, and the rear inner corner thereof is sharp, as at 21. The forward face 22 of the annulus 18, in cross section, extends in a straight plane and which terminates in a rounded outer corner 23, which merges into a peripheral shoulder 24, arranged rearwardly of the front face 22. The outer side face 25 of the annulus 18, in cross section, extends downwardly upon an inclined plane from the outer end of the shoulder 24 to the forward end of the outer side face of a rearwardly extending annular abutment 26 of semi-circular cross section throughout. The abutment 26 forms the outer part of the rear face 27 of the annulus and further said abutment has its rear face forming a curved contacting surface for the flange of the bearing roller. The contacting surface is positioned throughout clear of and inwardly with respect to the plane of said outer side face 25. The rear face 27 of the annulus 18 has the inner part thereof inset forwardly throughout with respect to the abutment 26 and in cross section said forwardly inset portion is of concave curvature throughout to form a shallow groove 28. As the inner part of the rear face 27 of the annulus is inset with respect to the abutment 26, the rear inner corner 21 of the annulus is arranged forwardly with respect to the abutment 26. The setting up of the outer side face 25 of the annulus 18, in a manner as stated, provides the cone 4 with a bevelled outer face which opposes the bevelled inner face of the cup or race member 3 when the cone is set up relative to the cup, and the inclination of the inner face of the cup is such with respect to the inclination of the outer face of the cone, or vice versa, that the opening formed between said elements will gradually increase in width from the rear face of said element towards the forward face thereof to provide for the contact of the cup and cone with the cone-shaped rollers positioned therebetween.

Each of the rollers 1 consists of a frustoconical body portion 29, gradually decreasing in diameter from the outer towards the inner end thereof, and further having the periphery thereof uninterrupted from end to end. The length of the body portion 29 is the same as the width of the inner face 17 of the cup or the outer face 25 of the cone, and when the roller is mounted in position, the outer end of the body portion 29 is flush with the shoulder 24.

Figure 2:
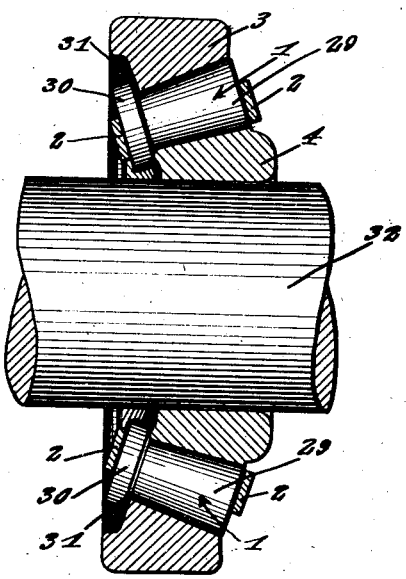
Figure 2 is a section on line 2—2, Figure 1.

Each of the rollers further includes a circular head 30 of substantial thickness and of a diameter greater than the greatest diameter of the body portion 29 to provide a flange extending circumferentially with respect to the body portion 29. The inner or smaller end of the body portion 29 is formed integral concentrically with respect to the forward face of the head 30. The exposed portion 31 of the forward face of the head 30 extends upon a slight inclination downwardly from the point of joinder of the body portion 29 with the head 30 to the edge of the latter. This slightly tapered or inclined portion of the forward face of the head 30 is engaged by the rounded rear outer corner 26 of the cone 4, and acts as a means to collect and provide for a full flow of lubricant throughout the periphery of the body portion 29, thereby preventing any possibility of the burning of the roller. The width of the portion 31 of the forward face of the head 30 is such as to project beyond the shoulder 26 and also to oppose the ledge 16, as clearly shown in Figures 2 and 5.

When the bearing is set up, the cone 4 is mounted on the shaft or journal 32, and the cage 2 with the rollers 1 positioned between the cup 3 and the cone 4. The rollers 1 extend at opposite inclinations, see Figure 2, and the rounded shoulder 26 is permanently in engagement with what may be termed the inner side of the portion 31 of the forward face of the head 30.

The construction and arrangement of the bearing is such that the shoulder 26 contacts with a very small part of the portion 31 of the forward face of the head 30, and owing to the fact that said portion 31 inclines away from the body portion 29, the head 30 is clear of contact with the ledge 16, which materially reduces friction to a minimum between the disk and the cup and cone. Further, the shoulder 26 acts as a means to keep the head 30 from engagement with the ledge 16, as said shoulder projects slightly beyond the point of joinder of the ledge 16 with the inner face 17 of the annulus 9. When the parts are set up, the groove 28 not only collects the lubricant but tends to direct it towards the forward face of the head 30 so that it will be taken up thereby and be distributed throughout the periphery of the body portion 26.

The cup 3 with its large end constructed in a manner as indicated at 15, 16 forms what may be termed a lubricant collector or reservoir and contributes to a great saving in lubricant. The cone 4, having its inner end constructed in a manner as indicated at 26 and 27 also provides a lubricant collector or reservoir and contributes to a saving in lubricant, as well as forms an end thrust bearing contact for the head or flange 30. The lubricant collector, reservoir or container at the rear of the cone is arranged forwardly of the lubricant container at the rear of the race member. The flanges or heads of the rollers partly oppose the lubricant container at the rear of the cone and extend into and are substantially free of full contact and free of edge contact with the walls of the lubricant container at the rear of the race member. Owing to the positioning of the lubricant reservoirs or containers in the manner as stated all the moving parts of the bearing are freely, adequately and continuously lubricated. The head or flange 30 on the inner end of the roller presses squarely up against the thrust portion 26 of the cone 4, this will give a true rolling line contact between the roller and the cone.

The body portion 29 of the roller, the flange formed by the head 30 and the shoulder 26 of the cone coacts to provide a true line contact for end thrust and a continuous true line rolling contact from the head 30 to the end of the body portion of the roller and with such contacts in the form of a T-square, that is to say a contact following transversely the flange of the head 30 and shoulder at the rear end of the cone and further lengthwise of the rolling line between the body portion 29 and the cone.
The end thrust contact between face of cone and head of roll, gives a line contact the transverse length of flange covering face of cone. The rolling line between cam and roll body line is a square line, being so separated by the end thrust line. This forms a T rolling line of contact, being squared by such. Its formation cannot be otherwise than a T-square rolling line contact, since the head of the roller is larger than any other part of the roller, it provides for roller running in true rolling line, which is important for high speed. The transverse line of contact prevents deviation of the body portion of the roller whereby the latter will be retained in true rolling line at all times under such conditions reducing friction to a minimum.

It is thought that the many advantages of an anti-friction bearing of the cone type, in accordance with this invention, can be readily understood, and although the preferred embodiment of the invention is as illustrated and described, yet it is to be understood that changes in the details of construction can be had which will fall within the scope of the invention as claimed.

What I claim is:—

1. In an anti-friction bearing the combination with a bearing roller formed of a body portion tapered throughout and gradually increasing in diameter from its inner to its outer end and a circular head of greater diameter than and having the central part of its forward face formed integral concentrically with the smaller end of said body portion, said body portion in lengthwise section from its point of joinder with said head extending continuous in the same plane throughout, that portion of said head projecting from said body portion providing an annular flange having its forward face inclining rearwardly from said body portion, of an annular bearing element having a bevelled outer side face of the same length as said body portion and upon which the latter is seated, said element further having the outer part of its rear end formed to provide a rearwardly extending annular abutment of semi-circular cross section at any point throughout thereof to provide a curved contacting surface positioned between the inner and outer faces of said body portion, said contacting surface bearing against the forward face of said flange in close proximity to the point of joinder of the disc with said body portion, and said element further having the inner part of its rear end arranged forwardly throughout with respect to said contacting surface and of a concave cross section to provide a lubricant reservoir.

2. In an anti-friction bearing the combination with a bearing roller formed of a body portion tapered throughout and gradually increasing in diameter from its inner to its outer end and a head of greater diameter than the smaller end of said body portion, formed integral with said end and providing a flange circumferentially disposed with respect to said body portion, said body portion in lengthwise section from its point of joinder with said head extending continuous in the same plane throughout, of an annular bearing element having a bevelled outer side face of the same length as said body portion and upon which the latter is seated, the rear end of said element and the said body portion and flange coacting to provide a continuous T-square line contact following transversely said flange and said end and lengthwise of the rolling line between the body portion and said element whereby said body portion will be prevented from deviating.

In testimony whereof, I affix my signature hereto.

OTTO HENSELMAN.